Patented May 28, 1946

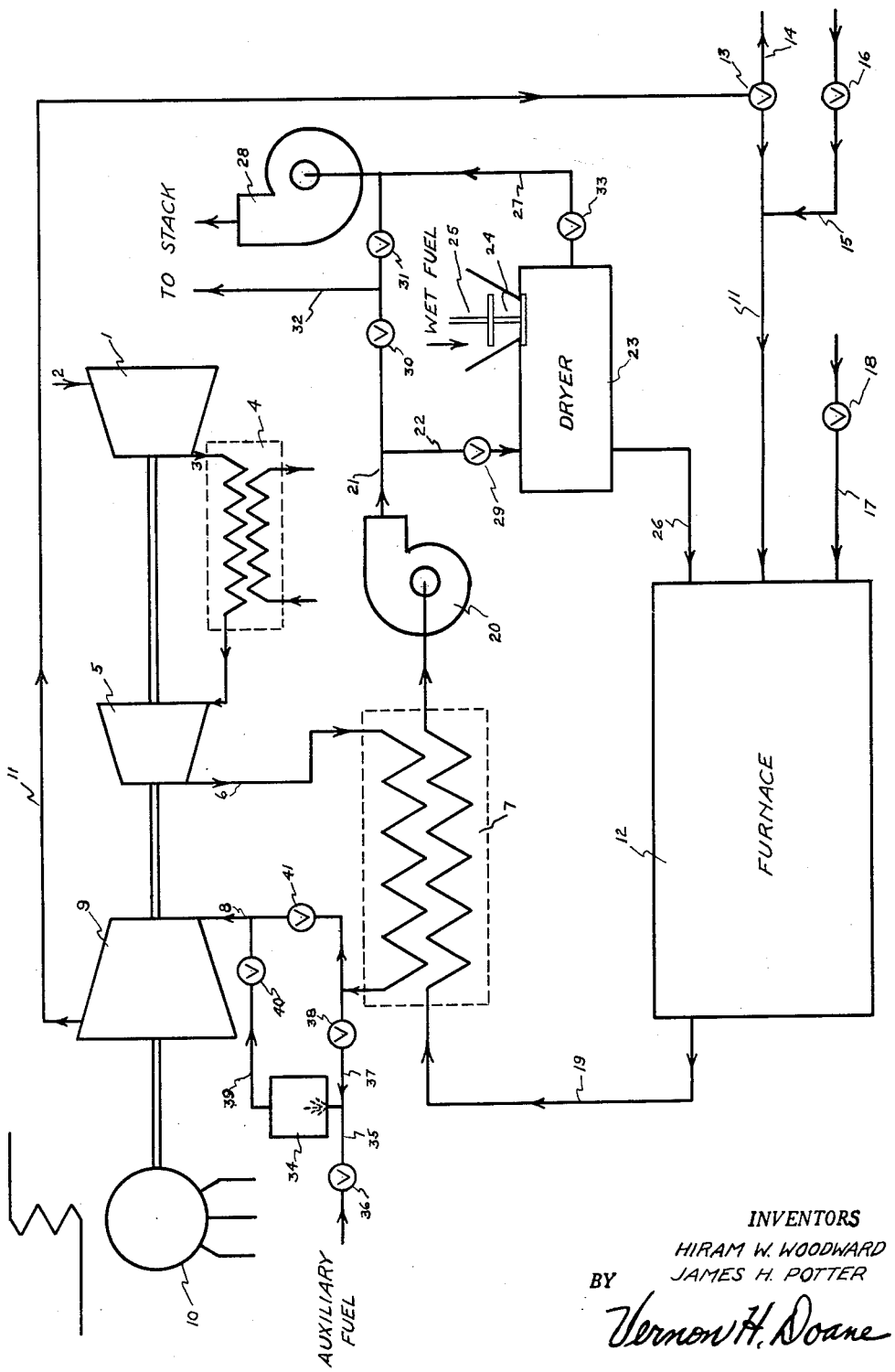

2,401,285

UNITED STATES PATENT OFFICE 2,401,285

GAS TURBINE SYSTEM

Hiram W. Woodward and James H. Potter, Baltimore, Md.

Application June 13, 1945, Serial No. 599,170

3 Claims. (Cl. 60—41)

This invention relates to a gas turbine system, particularly intended for use as a power plant utilizing as its primary fuel refuse, municipal garbage, industrial wastes, or other waste materials of high moisture content.

The disposal of municipal garbage presents many problems, particularly in large cities. Many industrial processes leave waste materials of high moisture content which have no reclamation value. The municipal garbage and the industrial wastes are not readily combustible because of their high moisture content. These waste products cannot be permitted to accumulate indefinitely, and in many instances it is necessary to immediately dispose of the products to prevent the existence of objectionable odors or hazards to health. Many cities, municipalities, and industries find it necessary to appropriate considerable sums of money for the purpose of disposing of waste materials of this general nature.

Our invention provides a system for generating useful power by using these objectionable waste products as the primary fuel. The invention provides a highly efficient power plant which permits the combustion of such waste materials, and which effectively and efficiently utilizes the heat resulting from their combustion.

The primary object of our invention is to provide a power plant which will produce useful power, while effecting disposal of objectionable waste products of high moisture content.

Another important object of our invention is to provide a highly efficient gas turbine system in which the exhaust from the turbine is used as preheated air for the combustion of the primary fuel in a furnace, and in which the heat of combustion in the furnace is used to supply heat to the inlet air to the turbine and also to effect drying of the waste materials of high moisture content in order that those waste materials may be used as fuel in the furnace.

A still further object of our invention is to provide means for operating the furnace and a fuel drying chamber at a pressure below atmospheric pressure in order to prevent escape of objectionable gases.

A further object of the invention is to provide an effective control for the power output of the gas turbine by controlled combustion of auxiliary fuel in an auxiliary combustion chamber.

The foregoing and other objects and advantages of the invention will be readily understood by reference to the following detailed description and the accompanying drawing.

The drawing diagrammatically illustrates the preferred embodiment of our invention.

Atmospheric air enters the compressor 1 through the air inlet 2, and after being compressed is discharged through the outlet 3. Although a single stage compressor could be used, we prefer to compress the air in two stages, as shown in the drawing. After leaving the compressor 1, the air is cooled in a heat exchanger 4, and then passes to the compressor 5, where it is further compressed.

The air leaves the compressor 5 through the line 6 and passes through a heat exchanger 7 in heat exchange relationship with the products of combustion of the furnace which is described hereinafter. After being heated to a high temperature in the heat exchanger 7, the air passes through the line 8 to a gas turbine 9. Expansion of the compressed and heated air in the gas turbine 9 provides power for driving any suitable load, such for example, as an alternator 10. As shown in the drawing, the gas turbine 9 also drives the compressors 1 and 5, although it will be apparent that the compressors may be driven by other suitable means if desired.

The exhaust from the gas turbine 9 is conducted through the line 11 to the furnace 12 to provide preheated combustion air for the combustion of the primary fuel in the furnace. The line 11 is provided with a two-way valve 13 which permits a portion of the exhaust air from the gas turbine to be vented to atmosphere through the line 14 in the event that such venting becomes desirable. Line 15 permits blending of atmospheric air into the exhaust gases in line 11 if such blending is found to be desirable. Line 15 is controlled by means of valve 16. Atmospheric air for accurately controlling combustion in the furnace 12 may be introduced through line 17 controlled by valve 18.

The products of combustion are withdrawn from the furnace 12 through line 19 by means of air pump 20. As shown in the drawing, these hot combustion products pass through the heat exchanger 7 in heat exchange relationship with the compressed air and serve to highly heat the compressed air prior to its introduction into the gas turbine 9. The temperature of the compressed air is thus increased, and the power available therefrom is correspondingly increased.

The capacity and speed of the air pump 20 are preferably so adjusted as to maintain the pressure within the furnace 12 slightly below atmospheric pressure to prevent escape of objectionable gases or odors from the furnace to the atmosphere.

The air pump 20 exhausts the products of combustion, which contain some residual heat, through the line 21 and into the line 22 which leads to a fuel dryer 23. In the dryer 23 the products of combustion come into direct contact with fuel of high moisture content which is introduced into the dryer through fuel inlet 24 which is controlled by means of a double valve arrangement 25.

The products of combustion entering the dryer 23 through the line 22 are deficient in oxygen and, as mentioned above, contain residual heat. These products of combustion effectively dry the fuel in the dryer 23 to an extent which permits its ready burning in the furnace 12, particularly in view of the fact that preheated combustion air is supplied to the furnace through the line 11. The thus dried fuel is transferred from the dryer 23 to the furnace 12 through the line 26 which is used to represent any convenient conveyor or transfer mechanism.

After performing their fuel drying function, the products of combustion are withdrawn from the dryer through the line 27 by means of the air pump 28. The capacity and speed of the air pump 28 are preferably adjusted so as to maintain a pressure in the dryer 23 which is slightly below atmospheric pressure to prevent escape of objectionable gases or odors from the dryer.

Under some circumstances it may not be necessary to pass all of the products of combustion from the furnace 12 through the dryer 23. In that case the valve 29 in the line 22 may be partially closed, and the valve 30 in the line 21 may be opened. If it is not desired to have the combustion products which by-pass the dryer pass through the air pump 28, the valve 31 may remain closed and those products of combustion will pass to the stack through the line 32.

If it is desired to use in our system a fuel which is already sufficiently dry for combustion, all of the products of combustion may by-pass the dryer 23 and pass directly to the stack through the line 21 and either the line 32 or the air pump 28. In this case the valve 33 in the line 27 should be closed. By appropriate manipulation of the valves 29, 30, 31 and 33, it is possible to selectively control the flow of combustion gases between the air pump 20 and the stack.

We provide an auxiliary combustion chamber 34 for the combustion of auxiliary liquid or gaseous fuel. The purpose of this auxiliary fuel is to regulate and control the power output of the gas turbine 9. Auxiliary liquid or gaseous fuel is introduced to the combustion chamber through the fuel line 35 controlled by a valve 36. Compressed and heated air is introduced into the combustion chamber 34 through the line 37 which contains the valve 38. Products of combustion in the auxiliary combustion chamber 34 pass through the line 39, valve 40, and line 8 to the turbine 9. The line 8 is provided with a throttling valve 41 and by proper control of the valves 38, 40 and 41, it is possible to control the quantity of air flowing through the auxiliary combustion chamber 34. This combustion of auxiliary fuel provides an effective control for the gas turbine and is particularly advantageous during periods of peak load.

The foregoing description relates to what we now consider to be the preferred embodiment of our invention. However, it is obvious that various changes may be made in the system without departing from the scope of our invention, as defined by the following claims.

Having thus described our invention, we claim:

1. A power plant adapted to use a fuel which is normally non-combustible because of high moisture content, said power plant comprising a compressor for compressing atmospheric air, a gas turbine arranged to use the thus compressed air as a motive fluid, a furnace utilizing the exhaust air from said gas turbine as combustion air, means for transferring a portion of the heat of combustion in said furnace to the air compressed by said compressor to thereby increase the temperature of such air prior to expansion of such air in said gas turbine, a fuel drying chamber arranged to receive fuel of high moisture content, means for passing the products of combustion from said furnace through said drying chamber to effect drying of said fuel by residual heat in said combustion products, and means for transferring the thus dried fuel from said drying chamber to said furnace.

2. A power plant adapted to use a fuel which is normally non-combustible because of high moisture content, said power plant comprising a compressor for compressing atmospheric air, a gas turbine arranged to use the thus compressed air as a motive fluid, a furnace utilizing the exhaust air from said gas turbine as combustion air, means for transferring a portion of the heat of combustion in said furnace to the air compressed by said compressor to thereby increase the temperature of such air prior to expansion of such air in said gas turbine, a fuel drying chamber arranged to receive fuel of high moisture content, air pump means for withdrawing hot combustion products from said furnace through said drying chamber in direct contact with fuel in said drying chamber, said air pump means being operative to maintain pressures at least slightly below atmospheric pressure in said furnace and said drying chamber, and means for transferring dried fuel from said drying chamber to said furnace.

3. A power plant as described in claim 1 having a control for said gas turbine comprising an auxiliary combustion chamber for combustion of auxiliary fuel therein, means for introducing hot products of combustion from said auxiliary fuel to the air compressed by said compressor prior to expansion of such air in said gas turbine, and means for controlling the rate of combustion of auxiliary fuel in said auxiliary combustion chamber.

HIRAM W. WOODWARD.
JAMES H. POTTER.